United States Patent
Wischhof et al.

(10) Patent No.: US 9,049,180 B2
(45) Date of Patent: Jun. 2, 2015

(54) METHOD FOR PROVIDING A SIGNAL OUTPUT ON THE BASIS OF A MAIN FILE AND AT LEAST ONE SECONDARY FILE, AND MOTOR VEHICLE

(75) Inventors: Lars Wischhof, Ingolstadt (DE); Matthias Bezold, Buckenhof (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/238,013

(22) PCT Filed: Aug. 4, 2012

(86) PCT No.: PCT/EP2012/003341
§ 371 (c)(1),
(2), (4) Date: Feb. 10, 2014

(87) PCT Pub. No.: WO2013/020691
PCT Pub. Date: Feb. 14, 2013

(65) Prior Publication Data
US 2014/0207910 A1 Jul. 24, 2014

(30) Foreign Application Priority Data
Aug. 10, 2011 (DE) .......................... 10 2011 109 917

(51) Int. Cl.
G06F 15/16 (2006.01)
H04L 29/08 (2006.01)
G06F 17/30 (2006.01)

(52) U.S. Cl.
CPC ............ *H04L 67/06* (2013.01); *G06F 17/3023* (2013.01); *H04L 67/125* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 6,665,867 B1 * | 12/2003 | Ims et al. | ....................... | 717/173 |
| 7,975,229 B2 * | 7/2011 | Parupudi et al. | .............. | 715/747 |
| 8,751,925 B1 * | 6/2014 | Zhang et al. | ................... | 715/241 |
| 2005/0131900 A1 | 6/2005 | Palliyll et al. | | |
| 2006/0106806 A1 * | 5/2006 | Sperling et al. | ................. | 707/10 |

(Continued)

FOREIGN PATENT DOCUMENTS

| DE | 102008047915 | 3/2010 |
|---|---|---|
| DE | 102008059098 | 6/2010 |

(Continued)

OTHER PUBLICATIONS

Terence Kelly, "Thin-client Web Access patterns: Measurements from a cache-busting proxy," Computer Communications, vol. 25, No. 4, Mar. 1, 2002, pp. 357-366.

(Continued)

*Primary Examiner* — Patrice Winder
(74) *Attorney, Agent, or Firm* — Staas & Halsey LLP

(57) ABSTRACT

In order to provide additional functionalities in an infotainment system of a motor vehicle, a method for providing a signal output, in which a main file is transmitted that refers to secondary files and indicates an identifier related to each secondary file. The identifier can be calculated upon receipt of the main file (for example in the motor vehicle) for a secondary file already provided in the motor vehicle and compared with the identifier contained in the main file. Thus, the secondary file does not need to be downloaded every time, but can be provided in a buffer memory. The identifier shows if the secondary file provided is the most recent version thereof.

18 Claims, 1 Drawing Sheet

(56) References Cited

U.S. PATENT DOCUMENTS

| | | | |
|---|---|---|---|
| 2007/0149115 A1* | 6/2007 | White et al. | 455/3.06 |
| 2008/0028395 A1* | 1/2008 | Motta et al. | 717/177 |
| 2009/0144395 A1* | 6/2009 | DeSalvo | 709/219 |
| 2009/0259691 A1* | 10/2009 | Tanskanen et al. | 707/200 |
| 2011/0145287 A1* | 6/2011 | Jiang et al. | 707/780 |
| 2014/0006555 A1* | 1/2014 | Shields | 709/217 |

FOREIGN PATENT DOCUMENTS

| | | |
|---|---|---|
| DE | 102011109917.8 | 8/2011 |
| WO | PCT/EP2012/003341 | 8/2012 |

OTHER PUBLICATIONS

Craig Simonds, "Transportaion IT—Software for the next-generation automobile," IT Professional, IEEE Service Center, Los Alamitos, CA, vol. 5, No. 6, Nov. 1, 2003, pp. 7-11.

Akhtar Jameel et al., "Internet multimedia on wheels: connecting cars to cyberspace," Intelligent Transportation System, 1997, IEEE Conference on Boston, MA, USA, Nov. 9-12, 1997, pp. 637-642.

E. C. Nelson et al., "An embedded architectural framework for interaction between automobiles and consumer devices," Proceedings of the 10$^{th}$ IEEE Real-Time and Embedded Technology and Applications Symposium (RTAS'04), May 25, 2004, pp. 192-199.

Jan Curín et al., "Architecture Model and Tools for Perceptual Dialog Systems," Sep. 8, 2008, Text, Speech and Dialogue (Lecture Notes in Computer Science), pp. 561-568.

English language International Search Report for PCT/EP2012/003341, mailed Oct. 16, 2012, 3 pages.

German Office Action for German Priority Patent Application No. 10 2011 109 917.8, issued Jun. 15, 2012, 5 pages.

German Office Action for German Priority Patent Application No. 10 2011 109 917.8, issued Mar. 13, 2013, 10 pages.

WIPO English language translation of International Preliminary Report on Patentability for PCT/EP2012/003341, mailed Feb. 13, 2014, 9 pages.

* cited by examiner

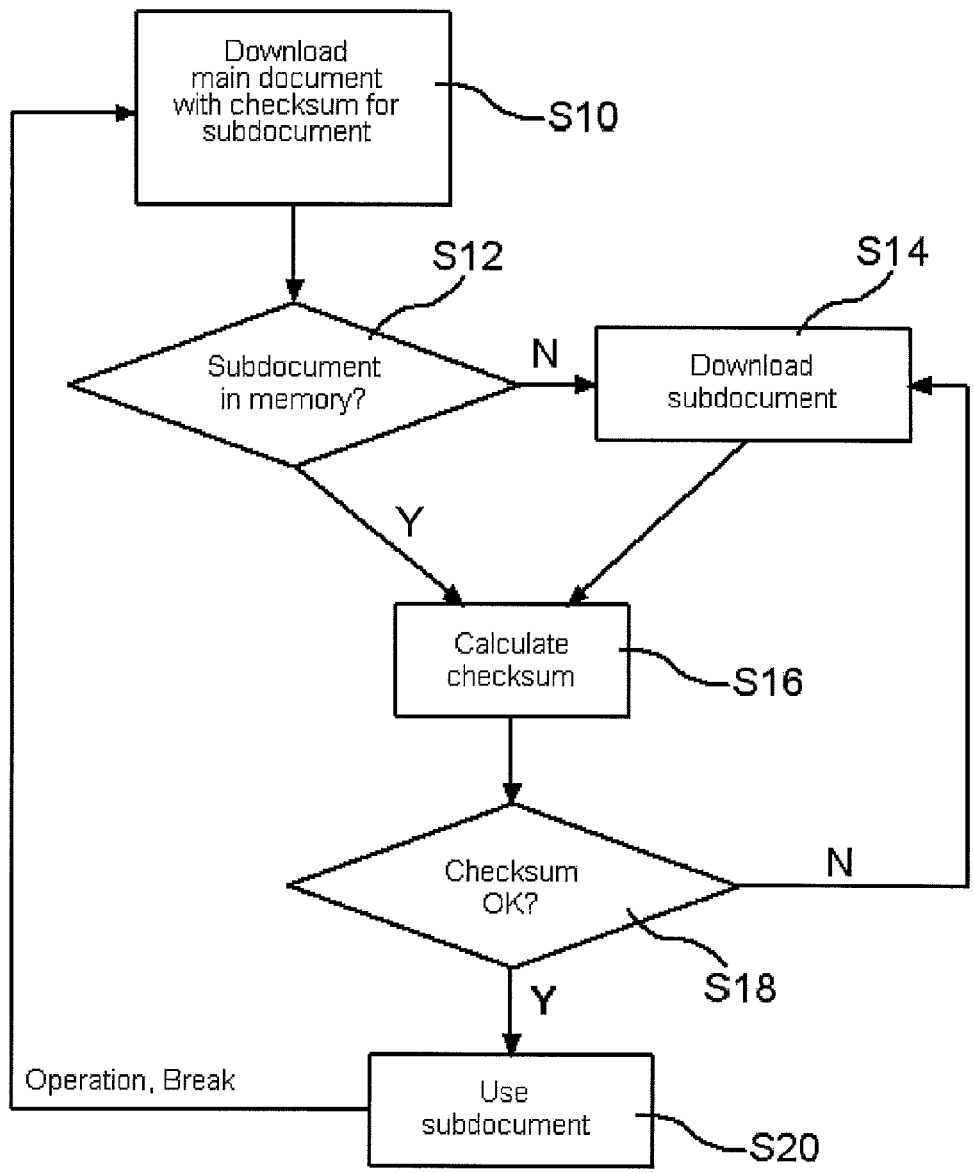

US 9,049,180 B2

METHOD FOR PROVIDING A SIGNAL OUTPUT ON THE BASIS OF A MAIN FILE AND AT LEAST ONE SECONDARY FILE, AND MOTOR VEHICLE

CROSS REFERENCE TO RELATED APPLICATIONS

This application is based on and hereby claims priority to International Application No. PCT/EP2012/003341 filed on Aug. 4, 2012 and German Application No. 10 2011 109 917.8 filed on Aug. 10, 2011, the contents of which are hereby incorporated by reference.

BACKGROUND

The invention relates to a method for providing a signal output and to a vehicle.

Therefore, an apparatus linked to a data network is what caters for the signal output. A main file names at least one secondary file, and at least one secondary file determines a signal output. The main file and the at least one secondary file can be obtained (downloaded) by the apparatus via the data network.

Such a method is known from use of the internet (World Wide Web). In this case, the main file is available as an HTML document, for example, which specifies the basic framework for a graphical representation, and the secondary files represent individual images or icons to be incorporated into the graphical representation. The secondary files may also be video or audio files or the like.

The internet can be used in a vehicle particularly for what is known as "Remote HMI", remote human-machine interface. This involves extending the functionalities of the operator control apparatus of the vehicle (what is known as the infotainment system) retrospectively. However, this is complex because a large number of secondary files need to be loaded from the internet. The download of these secondary files gives rise to not inconsiderable costs for the data traffic. Furthermore, the download of such secondary files from the internet in a traveling vehicle can frequently cause interruptions and delays. As is usually known from the use of the internet, it is possible to make do with buffer-storing the secondary files in a memory in the vehicle. However, in this case the problem arises that a secondary file can also change: the infotainment therefore has to establish when it needs to replace a buffer-stored secondary file with a new version provided by the server of the manufacturer. In this case, it is a popular approach for the server of the manufacturer to use fields in the control protocol to denote whether a requested secondary file has changed. In the http (Hypertext Transfer Protocol) protocol, this is accomplished by using the http headers "ETag", "Modified-Since", "If-Modified-Since" and "If-None-Match", for example. A drawback in this case is that the infotainment system has to individually check with the server of the manufacturer, for each secondary file, whether said secondary file has changed. The signal output cannot take place until after an individual check has been performed for each of the secondary files to determine whether said secondary file has been modified. Added to this is that there is not always a reliable system time in the vehicle, which makes it difficult to use time-oriented mechanisms for updating the buffer store.

U.S. 2005/0131900 A1 describes a method for obtaining data from a network. The resources that are present on a client server are stored together with the hash values therefor in a memory. In this case, the client server may also be part of a local area network with a pool server, the memory of which stores copies of all the resources that are present in the local area network together with their associated hash values. The local area network may be coupled to a larger network, e.g. the World Wide Web. When a client requests a resource, the hash value associated with the requested resource is first of all transmitted to the client, and it is compared with the hash values stored in the memory of the client or that of the pool server. If this establishes that the requested resource is present in the proprietary memory or in the local area network, the requested resource is obtained via the local area network, otherwise the resource is downloaded from the larger network.

KELLY T: "Thin-client Web access patterns: Measurements form a cache-busting proxy", COMPUTER COMMUNICATIONS, ELSEVIER SCIENCE PUBLISHERS BV, AMSTERDAM, NL, vol. 25, No. 4, Mar. 1, 2002, pages 357-366, discloses a method for preventing redundant data transmission from a proxy server to a client. In this case, the browser stores all the received data without exception and makes habitual requests to the proxy server, and, before the proxy server transmits the requested data to the client, a checksum for the relevant data is first of all transmitted that the browser compares with the checksums for the stored data.

SUMMARY

It is therefore one possible object to develop a method and a motor vehicle such that the signal output can take place as quickly as possible and without excessive use of the data network.

The inventors propose a method that involves the main file being provided in a data processing device associated with the data network in the form that the main file respectively specifies for a plurality of secondary files a network address at which the secondary file can be obtained, and additionally an identifier that is formed using the data in the secondary file according to a predetermined rule. In addition, the main file is downloaded by the apparatus. Finally, a check is performed for each secondary file to determine whether a previously downloaded version is stored in a memory in the apparatus, and, if this is the case, the identifier is formed according to the predetermined rule using the secondary file in the memory, and, if the identifier formed in this manner matches the corresponding identifier from the downloaded main file, the secondary file from the memory is used, and otherwise the secondary file from the network address specified in the main file is downloaded and subsequently used. (The download preferably takes place even when no version of the secondary file at all has previously been stored in the memory of the apparatus.)

In the case of the proposed method, a change (update) in the secondary file requires only the identifier to be changed in the main file. The identifier can be transmitted very compactly as a data value. Everything else can then be performed by the apparatus itself, particularly just in a vehicle, as a result of which no further request is required to determine whether or not the secondary files are up to date; this is because this information is transmitted implicitly just by the identifier. This allows the method for providing a signal output to be carried out very quickly and therefore to be easily used particularly in a vehicle.

In one preferred embodiment, the data network comprises the World Wide Web (or relates to the internet in general). The internet exists as a data network anyway.

In a further preferred embodiment, the identifier comprises a checksum for a plurality of the data values and preferably all the data values in the respective secondary file. Preferably, the checksum is a hash value that is calculated using the SHA-256 method. A checksum is particularly easy to calculate. If it is formed from all the relevant data values or even all the data values as a whole, there is the assurance that the secondary file has actually not been updated.

The SHA-256 method is particularly reliable, and appropriate program modules for carrying out the method are easily available.

As already mentioned, the proposed method can be used particularly in a vehicle, which means that the apparatus is preferably part of a vehicle, namely particularly an operator control apparatus.

In this case, the main file preferably specifies the way in which functional units of the vehicle are to be operated. The main file therefore does not for its part need to cater for the signal output, but rather merely describes the flow of operator control itself as a superordinate file. Since the main file refers to the secondary files, it is of course possible for the secondary files to provide the signal output. Preferably, the secondary file in this case comprises an image file and/or an audio file and/or a video file.

Particularly in the cited application in a vehicle when the manner of operator control is described, it makes sense if the main file is in SCXML format, in which case it is merely also necessary for an interpreter to be provided in the vehicle. The SCXML format or generally any XML format allows commands and information to be communicated effectively without taking account of specifics of the target apparatus in which the file is intended to be used.

The vehicle proposed by the inventors comprises an operator control apparatus, a data interface for the wireless reception of files from the internet and a buffer store. The operator control apparatus is designed to receive a main file from a predetermined internet address and to read an identifier for a secondary file from this main file. In addition, the operator control apparatus is designed to read this secondary file from the buffer store, to calculate the identifier according to a predetermined rule from the read secondary file and to compare said identifier with the read identifier. In this way, the operator control apparatus in the vehicle is able to establish whether or not the secondary file has already been downloaded in its up-to-date version, and subsequent steps can be provided.

The operator control apparatus is designed to read an internet address from the main file if the calculated and read identifiers do not match and to download the secondary file from said internet address.

The "being designed" of the operator control apparatus can be ensured particularly by suitable programming, that is to say specific software, and at any rate it goes beyond the scope of the mere suitability of the operator control apparatus for the cited purpose.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a flowchart to explain one potential embodiment of the proposed method.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The infotainment system in a vehicle is intended to be provided with additional functionalities, and to this end the flow of operator control is intended to be provided via the internet.

First, in S10, a main document is downloaded from the internet, specifically from an internet address that is known to the infotainment system of the motor vehicle, and which said infotainment system sends an appropriate request, e.g. by virtue of the pushing of a "button" for download or by virtue of an automatic call when the vehicle or a functional unit thereof is started. The downloaded main document is provided in SCXML format in the present case. It comprises a checksum for a subdocument, that is to say for a secondary file that is used for implementing an operator control concept for the infotainment system on the basis of the SCXML file in order to cater for a signal output, be it a visual, audible, haptic or other signal output.

In S12, a check is then performed to determine whether this subdocument is already stored in a buffer store in the motor vehicle because it has already been stored during a previous pass of the method. If the document is not stored, it is downloaded from the internet from an internet address that is cited in the main document for the subdocument, see S14.

If the subdocument is stored in the memory, in S16 the motor vehicle calculates the checksum from the subdocument, for example on the basis of the SHA-256 method ("hash value"). In S18, a check is then performed to determine whether the checksum that the main document contains matches the checksum calculated in S16. If this is not the case, this means that the subdocument is not sufficiently up to date and needs to be updated, as a result of which the process transfers to S14. If the answer to the question in S18 is "Yes", the subdocument is used in S20. Once steps S12, S16, S18 and S20 are performed for all the subdocuments, the motor vehicle can be operated, just by using the functionality provided by the main document, and/or there may be a break in the operation of the motor vehicle.

On a subsequent occasion, e.g. when the motor vehicle or a functional unit thereof is started again, the process begins with S10 again. It goes without saying that the subdocument can normally be taken from the memory and does not always need to be downloaded afresh again. This saves time and computation capacity during operation of the infotainment system of the motor vehicle, and the memory also does not need to be excessively full, but rather can be limited by using criteria such as size or maximum number of elements to be stored. The buffer store of the vehicle can be persisted for a bus idle state in the vehicle, as a result of which it is also available over multiple bus cycles.

FIG. 1 shows that the process transfers from S14 to S16, that is to say that a check is also performed to determine whether the subdocument has been downloaded correctly. It may also be possible to dispense with this check, and it is possible to transfer from S14 directly to S20 (not shown in FIG. 1).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide V. DIRECTV, 69 USPQ2d 1865 (Fed. Cir. 2004).

The invention claimed is:

1. A method for producing a signal output, comprising:
providing in a vehicle, an apparatus linked to a data network, the apparatus having a memory;
automatically downloading a main file when the vehicle is started, the main file being downloaded by the apparatus, the main file being downloaded from a data processing device associated with the data network, the main file specifying a plurality of secondary files and for each secondary file, the main file specifies:
a network address at which the secondary file can be obtained, and
a first identifier formed according to a predetermined rule, using data in the secondary file;
for each secondary file specified by the main file, checking whether a previously downloaded version of the secondary file is stored in the memory of the apparatus, and if so, forming a second identifier according to the predetermined rule using data in the previously downloaded version of the secondary file, and if the second identifier matches the first identifier specified in the main file, using the previously downloaded version of the secondary file and otherwise downloading a required version of the secondary file from the network address specified in the main file and using the required of the secondary file; and
producing the signal output from the apparatus using the main file and the secondary files, wherein the main file describes an operator sequence for the apparatus and the main file specifies the secondary files which implement the operator sequence for the signal output.

2. The method as claimed in claim 1, wherein the data network comprises the World Wide Web.

3. The method as claimed in claim 1, wherein the predetermined rule comprises calculating a checksum for a plurality of data values in the secondary file.

4. The method as claimed in claim 1, wherein the predetermined rule comprises calculating a checksum for all data values in the secondary file.

5. The method as claimed in claim 1, wherein the predetermined rule comprises calculating a hash value using a Secure Hash Algorithm SHA-256 method.

6. The method as claimed in claim 1, wherein the first identifier comprises a checksum calculated for a plurality of data values in the required version of the secondary file.

7. The method as claimed in claim 1, wherein the second identifier comprises a checksum calculated for a plurality of data values in the previously downloaded version of the secondary file.

8. The method as claimed in claim 3, wherein the main file specifies how functional units of the vehicle are to be operated.

9. The method as claimed in claim 1, wherein the apparatus is a vehicle infotainment device, and the main file specifies how the infotainment device is to be operated.

10. The method as claimed in claim 1, wherein the plurality of secondary files comprises at least one of an image file, an audio file and a video file.

11. The method as claimed in claim 1, wherein at least one of the plurality of secondary files is an image file.

12. The method as claimed in claim 1, wherein at least one of the plurality of secondary files is an audio file.

13. The method as claimed in claim 1, wherein at least one of the plurality of secondary files is a video file.

14. The method as claimed in claim 1, wherein the main file is provided in XML format.

15. The method as claimed in claim 1, wherein the main file is provided in SCXML format.

16. The method as claimed in claim 1, wherein the main file is downloaded via a wireless data interface.

17. The method as claimed in claim 1, wherein the main file and the downloaded version of the secondary file are downloaded via a wireless data interface.

18. A vehicle having an operator control apparatus, the operator control apparatus comprising:
a data interface for wireless reception of files from the internet;
a buffer memory; and
a processor to:
request and receive a main file, which specifies a plurality of secondary files, from a predetermined internet address automatically when the vehicle is started, the main file specifying a plurality of secondary files and for each secondary file, the main file specifies an internet address at which the secondary file can be obtained and specifies a first identifier calculated according to a predetermined rule, using data in the secondary file;
check, for each secondary file specified by the main file, whether a previously downloaded version of the secondary file is stored in the buffer memory, and if so, to read the previously downloaded version of the secondary file and calculate a second identifier according to the predetermined rule using the previously downloaded version of the secondary file and to compare the second identifier with the first identifier, and if the second identifier matches the first identifier specified in the main file, using the previously downloaded version of the secondary file, and if the second identifier does not match the first identifier, to read the internet address from the main file and to download a required version of the secondary file from the internet addresses; and
to produce a signal output using the main file and the secondary files, the main file describing an operator sequence for the signal output, the main also specifying the secondary files which implement the operator sequence for the signal output.

* * * * *

UNITED STATES PATENT AND TRADEMARK OFFICE
CERTIFICATE OF CORRECTION

| | |
|---|---|
| PATENT NO. | : 9,049,180 B2 |
| APPLICATION NO. | : 14/238013 |
| DATED | : June 2, 2015 |
| INVENTOR(S) | : Lars Wischhof et al. |

It is certified that error appears in the above-identified patent and that said Letters Patent is hereby corrected as shown below:

In the claims

Claim 18, Column 6, Line 54 (Approximately)

Delete "main also" and insert --main file also--, therefor.

Signed and Sealed this
Thirteenth Day of October, 2015

Michelle K. Lee
*Director of the United States Patent and Trademark Office*